United States Patent Office 3,197,970
Patented Aug. 3, 1965

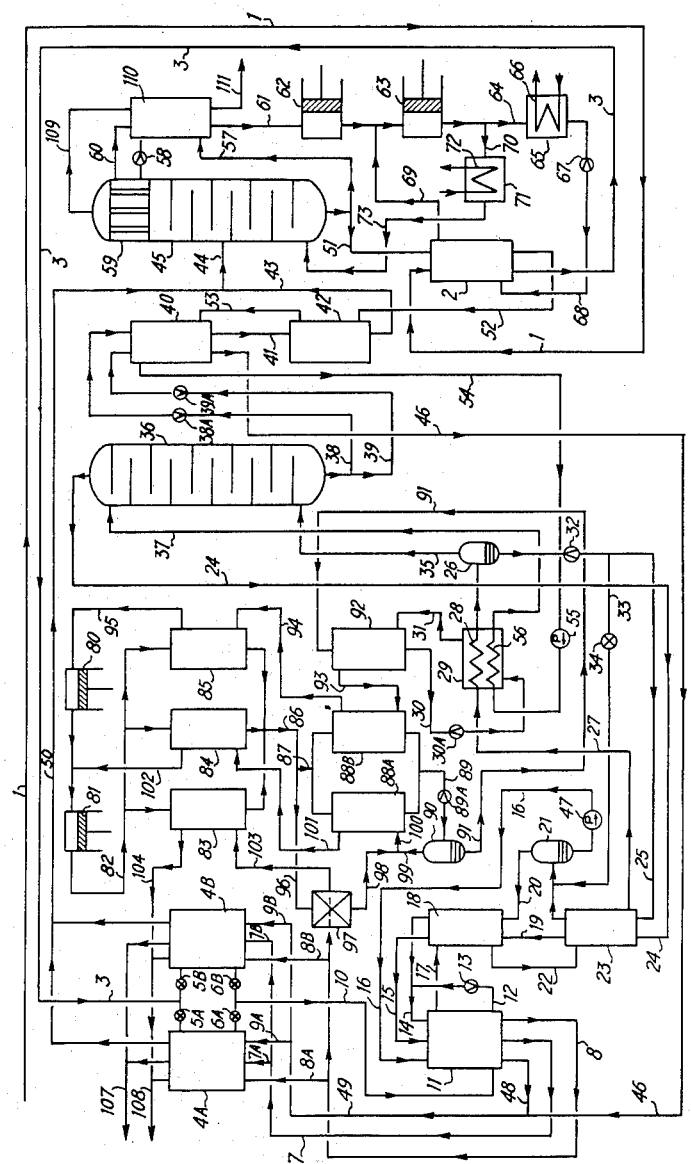

3,197,970
METHOD FOR THE PURIFICATION OF HYDROGEN
Warren Leonard Nelson, Montreal, Quebec, and Claude Salama, Mount Royal, Quebec, Canada, assignors to L'Air Liquide, Societe Anonyme Poul l'Etude et l'Exploitation des Procedes Georges Claude
Filed Apr. 16, 1963, Ser. No. 273,444
Claims priority, application France, Apr. 19, 1962, 895,069, Patent 1,329,645
3 Claims. (Cl. 62—17)

This invention relates to a method for the purification of hydrogen, and a particular object is a method for the elimination of impurities such as methane from impure hydrogen, through low-temperature washing of the latter with a liquid hydrocarbon less volatile than methane, in which the liquid hydrocarbon laden with impurities is regenerated through rectification under a pressure lower than the washing pressure, then sent back to contact the hydrogen to be purified.

It has already been suggested that impure hydrogen, containing methane and/or nitrogen and carbon monoxide, be purified through washing with a liquid hydrocarbon such as ethane, ethylene, propane, propylene, or a mixture of two or more of these.

The washing liquid was regenerated, either through simple expansion after warming up (U.S. Patent No. 3,021,682), or through counter-current stripping with a fraction of the purified hydrogen (U.S. Patents Nos. 2,940,270 and 2,956,410), or through rectification under the washing pressure (U.S. Patent No. 2,887,850).

The first method of regeneration makes it possible to purify the washing liquid adequately only if the vapor pressures of the washing liquid and of the least volatile impurity are very different. The second method involves the recontamination of a portion of the purified hydrogen, which can only serve for auxiliary uses, for instance as a fuel. The third method, in which the rectifying column is heated by heat exchange with the hydrogen to be purified, and cooled at the top through heat exhange with the purified hydrogen, has the disadvantage of lacking flexibility, as the variations of composition of the hydrogen to be purified influence the efficiency of the regeneration.

The method of this invention makes it possible to avoid the above disadvantages and to purify the whole of the hydrogen to about 99.9% with a very smooth operation.

The method of this invention comprises the refluxing of the liquid and the heating of the rectifying operation are effected through expanding a fraction of the regenerated liquid under a pressure lower than the rectifying pressure, vaporizing the expanded liquid with indirect heat exchange with the impurity-rich vapors separated from the liquid through rectification, then recompressing the vapors of the said fraction to the rectifying pressure and blowing the recompressed vapors into the bottom of the rectifying zone.

According to a first feature of the invention, a portion of the said fraction is liquefied, expanded, then vaporized through heat exchange with another fraction of the regenerated liquid, and sent back to compression.

According to a second feature, the impure hydrogen is cooled down to the washing temperature at least partly through heat exchange with a bath of liquid nitrogen, obtained by means of a closed circuit of nitrogen, used as an auxiliary cooling fluid.

Other features and advantages of the invention will appear through the detailed description hereafter, given as a non-limiting example, and by reference to the appended drawing of an apparatus for the purification of hydrogen through washing with liquid propane.

The hydrogen to be purified, having the following volume composition:

| | Percent |
|---|---|
| Hydrogen | 66.4 |
| Methane | 27.7 |
| $C_2$ hydrocarbons | 4.2 |
| $C_3$ hydrocarbons | 1.6 |
| $C_4$ hydrocarbons | 0.1 | is introduced through duct 1 into the purifying installation under an effective pressure of 62 bars, at a temperature of 35° C. and with a flow rate of 28,300 cubic meters per day (standard conditions). It is precooled in propane vaporizer 2 through heat exchange with pure liquid propane, then sent back through duct 3 to the warm side of a pair of exchangers 4A-4B. It cools down in one of the latter to its dew point, about −56° C. and sheds its moisture as frost, through heat exchange with three streams of cold gas:

(a) the purified hydrogen, introduced through one of the ducts 7A-7B and leaving through duct 107;

(b) the hydrocarbons separated through condensation during the cooling of the impure hydrogen, introduced through one of the ducts 8A-8B and leaving through duct 108;

(c) the methane-laden liquid propane issuing from washing column 36 through duct 39, exchanger 40, ducts 46-49 and one of the ducts 9A-9B.

Operationally, one of the exchangers 4A-4B operates while the other is being defrosted. Valves 5A-5B and 6A-6B make it possible to send the impure hydrogen into the desired exchanger.

The impure hydrogen issuing from the pair of exchangers 4A-4B then goes through duct 10 to reflux exchanger 11, where it cools down to about −68° C. through heat exchange with the pure hydrogen, with the liquid hydrocarbons separated in separator 21, and with the vapors from that separator. While the impure hydrogen cools down, all the butane it contained is condensed, as well as a small amount of lighter hydrocarbons. Those hydrocarbons are separated through duct 12 at the bottom of the exchanger, expanded in valve 13 and combined in duct 14 with the vapors from separator 21 as they go into exchanger 11.

The impure hydrogen next goes through duct 17 into exchanger 18, where it cools down again to about −80° C. through heat exchange with the pure hydrogen and with the vapors issuing from separator 21, while another fraction of the hydrocarbons it contains is condensed. It is then introduced through duct 22 into exchanger 23, where it is cooled down to about −167° C. through heat exchange with pure hydrogen and with the expanded liquid hydrocarbons from separator 26. It finally goes through duct 27 into coil 28, which is immersed in a bath of liquid nitrogen under an absolute pressure of about 4.5 bars, and where its temperature reaches −175° C., then into separator 26, where most of the hydrocarbons initially contained in the impure hydrogen, notably methane, are collected. The latter are expanded in valve 32 to an effective pressure of about 1 bar. One portion goes through duct 25 into exchanger 23, where it is warmed up, while the other portion is combined with the first through duct 33, with flow control by valve 34, at the warm end of the exchanger. The combined flow is then introduced into separator 21.

The vapors issuing from separator 21 go through duct 20 into exchanger 18. After addition through expanding valve 13 of the butanes condensed in exchanger 11, they are introduced through duct 14 into the latter exchanger. They finally go through ducts 8 and 8A or 8B to one of the exchangers 4A-4B, and are then discharged at room temperature through duct 108. They then contain over 80% methane, about 12% $C_2$ hydrocarbons, and a few percent $C_3$ and $C_4$ hydrocarbons, as well as some dissolved hydrogen.

The hydrogen as from separator 26, which still contains a little methane, is then introduced through duct 35 into the bottom of washing column 36.

This washing column is fed at the top with cold liquid propane introduced through duct 37. Through countercurrent contact between the hydrogen and the liquid propane inside column 36, the impurities, notably methane, are dissolved in the liquid propane. The purified hydrogen, containing only 0.1-0.2% hydrocarbons, is discharged from the top of column, then goes successively through ducts 24, 19, 15 and 7 into exchangers 23, 18, 11 and 4A or 4B, before it is sent to use in 107, under an effective pressure of about 61 bars and at a temperature of about 0° C., with a flow rate of about 18,400 cubic meters per day.

The liquid propane at about −175° C., laden with impurities, is discharged at the bottom of column 36 and divided into two portions, which go through ducts 38 and 39, then through expanding valves 38A and 39A, to an effective pressure of about 12 bars. Both portions are warmed up in parallel inside exchanger 40 to −60° C. through heat exchange with the regenerated liquid propane coming through duct 53. The first portion is then sent back through ducts 46 and 49, after addition through duct 48 of the propane-rich liquid hydrocarbons issuing from separator 21 and driven back by pump 47 into duct 16 and exchanger 11, so as to compensate for the unavoidable losses of propane during the regeneration of the washing liquid. It then goes through one of the ducts 9A–9B into the exchanger 4A or 4B in operation. After having been warmed up to about 0° C. in exchangers 4A-4B, the impure liquid propane is sent through ducts 50 and 44 to rectifying column 45 to be regenerated.

The second portion of the impure liquid propane goes through duct 41 into exchanger 42, where it is warmed up to 0° C. by the regenerated liquid propane coming through duct 52. It then goes through ducts 43 and 44 into rectifying column 45.

Inside column 45, the volatile impurities dissolved in the propane are separated at the top as gases, with a little carried-over propane, while the regenerated liquid propane is separated at the bottom. The separated methane-rich vapors, discharged through duct 109, are warmed up in exchanger 110 to about 30° C. through heat exchange with the fraction of liquid propane to be vaporized in condenser 59 at the top of the column, as described lower, then are discharged through duct 111.

On the other hand, the regenerated liquid propane issuing from column 45 at about 40° C. is divided into two portions. The first portion, which is to provide the washing liquid, goes through ducts 51 into propane vaporizer 2, where it is cooled down to 5° C. through heat exchange with the low-pressure liquid propane coming through ducts 68. It then goes through duct 52 into exchanger 42, where it is further cooled down to about −38° C. through heat exchange with a portion of the impurity-laden propane from washing column 36 (already partly warmed up), then through duct 53 into exchanger 40, where it is cooled down to −170° C. by means of the two fractions of impurity-laden liquid propane from the bottom of washing column 36. It then goes through duct 54 to pump 55, which boosts it back to the pressure of washing column 36 and drives it into coil 56, which is immersed in liquid nitrogen bath 29. It is finally introduced through duct 37 into the top of the washing column.

The other portion of the regenerated liquid propane from the bottom of rectifying column 45 goes through a cycle which ensures that the top of the column is cooled down and the bottom warmed up. To this end, that fraction goes through duct 57 to exchanger 110, where it is supercooled to about 7° C. through heat exchange with the methane-rich vapors from the top of the column and with the low-pressure propane vapors from condenser 59. It is then expanded in valve 58 to an effective pressure of about 1 bar, vaporized in condenser 59 at the top of column 45, then sent back through duct 60 into exchanger 110, where it is warmed up before it is introduced into the first compression stage 62, which brings it to an effective pressure of about 3.5 bars. After the addition through duct 69 of vapors, the origin of which is indicated below, it is boosted by the second compression stage 63 to an effective pressure of about 12 bars, then sent through duct 70 to cooler 71, provided with water coil 72. It is then sent back through duct 73 to the bottom of column 45.

Before the cooling in water cooler 71, an auxiliary fraction has been separated, sent through duct 64 to cooler 65, provided with water coil 66, expanded in valve 67 to an effective pressure of about 3.5 bars, and sent through duct 68 to vaporizer 2, where it exchanges heat with the impure hydrogen feed and with the portion of the regenerated propane sent back to washing column 36. The vapors emitted are sent back through duct 69, to the suction side of the second compression stage 63.

The source of low temperature required to operate the installation is provided by a closed circuit of nitrogen. The latter is introduced through duct 82 after having been compressed to about 180 bars, it is divided into three fractions, which go respectively through exchangers 83, 84 and 85, where they are cooled down to about −60° C. by a fraction of the hydrocarbon gas from exchanger 11, by nitrogen expanded to medium pressure, and by nitrogen expanded to low pressure. The high-pressure nitrogen thus cooled, issuing through duct 86, is divided into two portions. The first portion goes through duct 96 into expansion engine 97, where it is expanded to about 10 bars and cooled down to about −167° C. The other fraction is cooled down for one part in exchanger 88A through heat exchange with medium-pressure nitrogen, and for another part in exchanger 88B through heat exchange with low-pressure nitrogen. It is then sent through duct 89 and expanding valve 89A to liquid separator 90.

The nitrogen expanded in expander 97 is combined through duct 98 with the nitrogen vapor from separator 99, and the mixture successively goes through ducts 100 and 101 to exchangers 88A and 84, where it warms up to room temperature, then back to the second compression stage 81.

The liquefied nitrogen collected in separator 90 is sent through duct 91 to exchanger 92, where it is cooled down counter-current with nitrogen gas vaporized from nitrogen bath 29, then goes through duct 30 and expanding valve 30A, under an effective pressure of about 3.5 bars to liquid nitrogen bath 29, which is used to effect the final cooling down to −175° C. of the impure hydrogen before it is introduced into the washing column, and the supercooling of the liquid propane sent to the top of the same column. The nitrogen gas emitted from that bath successively goes through ducts 31, 93 and 94 to exchangers 92, 88B and 85, where it warms up to room temperature. It is then sent back through duct 95 to the first compression stage 80 of the circulating nitrogen.

What we claim is:

1. A method for the elimination of normally gaseous impurities from impure hydrogen, comprising:
    (a) washing impure hydrogen in a wash zone at a low temperature with a liquid hydrocarbon less volatile than methane, thereby to produce relatively pure hydrogen and impurity-laden liquid hydrocarbon at a first pressure,
    (b) rectifying said impurity-laden liquid hydrocarbon in a rectifying zone at a second pressure lower than said first pressure, thereby producing impurity-rich vapors and regenerated liquid hydrocarbon, (c) expanding a portion of regenerated liquid hydrocarbon to a third pressure lower than said second pressure,
(d) subcooling a further portion of regenerated liquid hydrocarbon by heat exchange with said expanded liquid hydrocarbon thereby vaporizing expanded liquid hydrocarbon,
(e) compressing said vaporized expanded hydrocarbon to said second pressure and introducing it into a lower portion of said rectifying zone, and
(f) introducing said subcooled regenerated liquid hydrocarbon into said wash zone as wash liquid.

2. A method for the elimination of normally gaseous impurities from impure hydrogen, comprising:
(a) washing impure hydrogen in a wash zone at a low temperature with a liquid hydrocarbon less volatile than methane, thereby to produce relatively pure hydrogen and impurity-laden liquid hydrocarbon at a first pressure,
(b) rectifying said impurity-laden liquid hydrocarbon in a rectifying zone at a second pressure lower than said first pressure, thereby producing impurity-rich vapors and regenerated liquid hydrocarbon,
(c) expanding a portion of said regenerated liquid hydrocarbon to a third pressure lower than said second pressure,
(d) passing said expanded portion in indirect heat exchange with said impurity-rich vapors thereby to produce reflux in said rectifying zone and to vaporize at least a portion of said expanded portion,
(e) recompressing said vaporized portion,
(f) liquefying at least a portion of said recompressed vapors,
(g) expanding the liquefied recompressed vapors to a fourth pressure lower than said second pressure,
(h) subcooling a further portion of regenerated liquid hydrocarbon by heat exchange with said expanded liquefied recompressed vapors thereby vaporizing the latter,
(i) compressing the latter vaporized material to said second pressure and introducing it into a lower portion of said rectifying zone, and
(j) introducing said subcooled regenerated liquid hydrocarbon into said wash zone as wash liquid.

3. A method for the elimination of normally gaseous impurities from impure hydrogen, comprising:
(a) washing impure hydrogen in a wash zone at a low temperature with a liquid hydrocarbon less volatile than methane, thereby to produce relatively pure hydrogen and impurity-laden liquid hydrocarbon at a first pressure,
(b) rectifying said impurity-laden liquid hydrocarbon in a rectifying zone at a second pressure lower than said first pressure, thereby producing impurity-rich vapors and regenerated liquid hydrocarbon,
(c) expanding a portion of said regenerated liquid hydrocarbon to a third pressure lower than said second pressure,
(d) passing said expanded portion in indirect heat exchange with said impurity rich vapors thereby to produce reflux in said rectifying zone and to vaporize at least a portion of said expanded portion,
(e) recompressing said vaporized portion to a fourth pressure,
(f) further recompressing said vaporized portion to substantially said second pressure,
(g) liquefying a portion of said recompressed vapors,
(h) expanding the liquefied recompressed vapors to substantially said fourth pressure,
(i) subcooling a further portion of regenerated liquid hydrocarbon by heat exchange with said expanded and recompressed liquefied vapors thereby vaporizing the latter,
(j) returning said latter vaporized material to said further recompression and introducing it into a lower portion of said rectifying zone, and
(k) introducing said subcooled regenerated liquid hydrocarbon into said wash zone as wash liquid.

References Cited by the Examiner
UNITED STATES PATENTS

| | | | |
|---|---|---|---|
| 2,600,110 | 6/52 | Hachmuth | 62—27 |
| 2,692,484 | 10/54 | Etienne | 62—28 X |
| 2,762,208 | 9/56 | Dennis | 62—40 X |
| 2,887,850 | 3/59 | Adams | 62—17 |
| 2,956,410 | 10/60 | Palazzo | 62—27 X |
| 3,062,015 | 11/62 | Cost | 62—17 |

NORMAN YUDKOFF, *Primary Examiner.*